Figure 1:
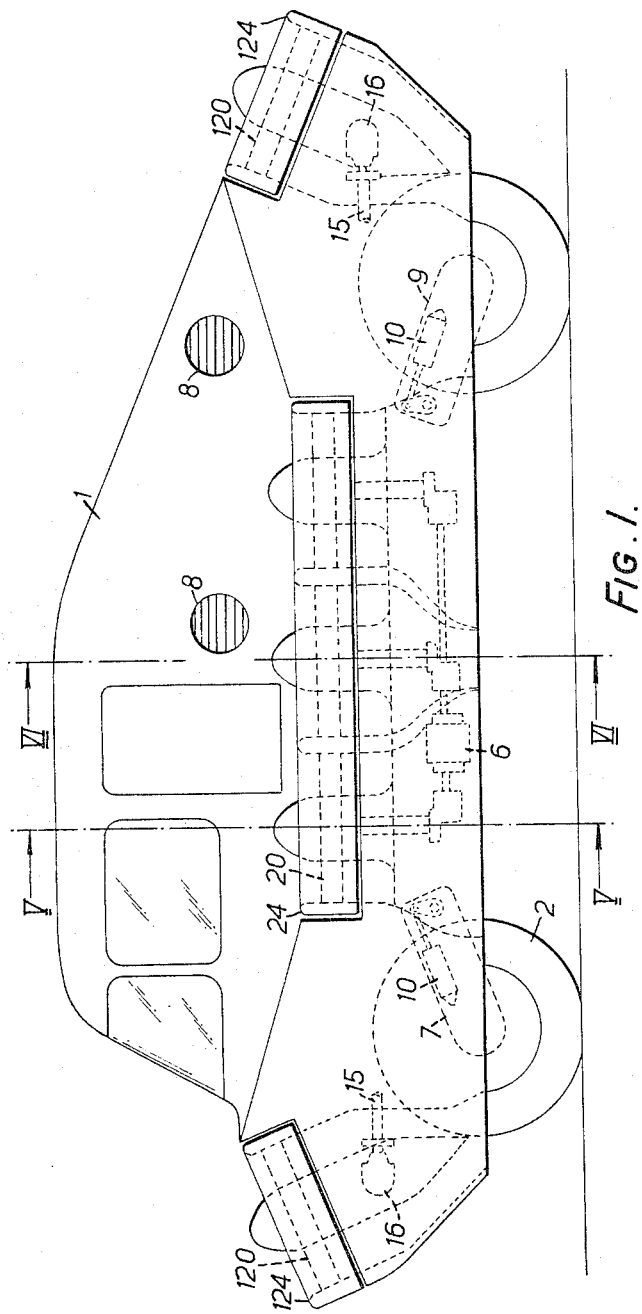

Oct. 4, 1966  R. G. TUCKNOTT ETAL  3,276,528
GROUND EFFECT VEHICLE WITH APPLIED DIFFERENTIAL
TORQUE STEERING MEANS
Filed May 20, 1963  9 Sheets-Sheet 1

INVENTORS
Robert George Tucknott
Peter John J Mudgley
BY
Martin E. Hogan, Jr.
ATTORNEY Oct. 4, 1966  R. G. TUCKNOTT ETAL  3,276,528
GROUND EFFECT VEHICLE WITH APPLIED DIFFERENTIAL
TORQUE STEERING MEANS
Filed May 20, 1963  9 Sheets-Sheet 6

INVENTORS
Robert George Tucknott
Peter John Midgley
BY
Martin E. Hogan, Jr.
ATTORNEY

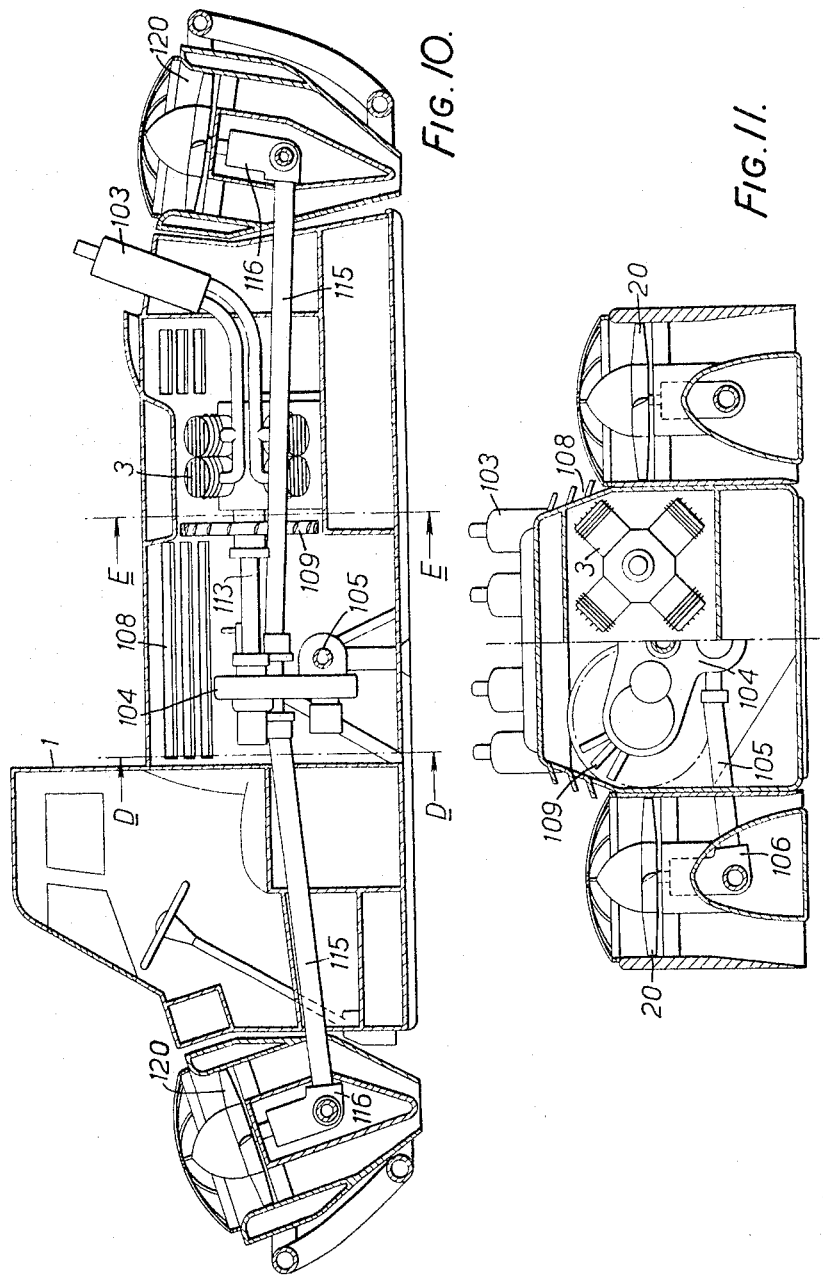

Oct. 4, 1966     R. G. TUCKNOTT ET AL     3,276,528
GROUND EFFECT VEHICLE WITH APPLIED DIFFERENTIAL
TORQUE STEERING MEANS
Filed May 20, 1963     9 Sheets-Sheet 8

INVENTORS
Robert George Tucknott
Peter John Mudgley
BY
Martin E. Hogan, Jr.
ATTORNEY Oct. 4, 1966  R. G. TUCKNOTT ETAL  3,276,528
GROUND EFFECT VEHICLE WITH APPLIED DIFFERENTIAL
TORQUE STEERING MEANS
Filed May 20, 1963  9 Sheets-Sheet 9

INVENTORS
Robert George Tucknott
Peter John Mudgley
BY
Martin E. Hogan, Jr.
ATTORNEY

United States Patent Office 3,276,528
Patented Oct. 4, 1966

3,276,528
GROUND EFFECT VEHICLE WITH APPLIED DIFFERENTIAL TORQUE STEERING MEANS
Robert George Tucknott and Peter John Midgley, Lytham-St. Annes, England, assignors to English Electric Aviation Limited, Westminster, London, England, a company of Great Britain
Filed May 20, 1963, Ser. No. 281,828
Claims priority, application Great Britain, May 23, 1962, 19,925/62
10 Claims. (Cl. 180—7)

The present invention relates to a gaseous jet thrust supported vehicle of the kind described in application Serial No. 150,095 filed November 3, 1961 and since abandoned, by F. W. Page, R. F. Creasey and J. T. Froud, and has the primary object of improving the vehicle described therein.

With this and other objects in view which will become apparent later from this specification and the accompanying drawings, we provide a gaseous jet thrust supported vehicle comprising in combination: a vehicle body, road wheels journalled on said body and supporting the same on the ground, a prime mover, a plurality of ducted fans mounted along the front edge, the rear edge and the lateral edges of said body and capable of being geared to said prime mover, in operation producing an outer and inner jet curtain enclosing at least one ground effect cushion of substantially rectangular plan form and having a substantially vertically momentum thrust of a magnitude less than the weight of said vehicle but exceeding the magnitude required for statically hovering at a steady hovering height, and propulsion means capable of being geared to said prime mover, in operation imparting a substantially horizontal thrust to said vehicle, said combination of vertical and horizontal thrust generating means enabling said vehicle to leap over obstacles of predetermined length and height, but not to sustain free flight above said steady hovering height.

Preferably but not necessarily one or more of jet curtains have an inward component towards its associated ground effect cushion.

Preferably a transverse gaseous jet curtain is arranged substantially in the middle of the vehicle so as to divide the ground effect cushion into two part cushions fore and aft of the middle of the vehicle.

Preferably the vehicle has two or more internal combustion engines capable of being coupled to road wheels for propulsion on the ground, and to the said ducted fans for hovering and leaping. Simultaneous driving of the wheels and the fans may be obtained and used for example to achieve directional control and/or improved traction over soft ground. For driving on the ground one engine only is required, while for hovering two or all engines are needed. The extra energy for a leap is stored in a fly-wheel mechanism preparatory to the leap, from which it is derived during the leap. A variable ratio gearing may be used between said fly-wheel mechanism and said ducted fans, in order to keep up the rotational speed of the later while the rotational speed of the fly-wheel mechanism gradually decreases.

Preferably the fly-wheel mechanism is divided into separate fly-wheels geared to the outer ducted fans of groups of such fans arranged along the front, the rear, and both sides of the vehicle, the ducted fans of each group being geared to one another by means of a transmission shaft driven by a central gear box, the gear boxes of all four groups being driven by a main gear box coupled to the propulsion engines. Thus the inner ducted fans of each group are driven substantially directly by the propulsoin engines, and the outer ducted fans by their associated fly-wheels, and the transmissions need dimensioning only for the torque differences to be compensated, but not for the full torque.

For starting the flywheel mechanism and the engines a hydraulic accumulator may be provided which through a hydraulic motor drives the main gear box, and by hydraulic pumps geared to the latter is recharged.

In order to save the weight of and space occupied by an ordinary steering mechanism, the vehicle may be steered on the ground by so-called skid-steering i.e. applying a greater torque to the road wheels on one side of the vehicle than on the other.

Stabilisation in the air is effected by controlling the blade angle and/or the rotational speed of the ducted fans differentially on both sides for roll, and fore-and-aft for pitch.

Control of steering in the air may be effected by means of vanes in the jet outlets to deflect the lifting thrust differentially so as to produce a yawing moment. Auxiliary jets may be used for steering and control in the air as according to our aforesaid co-pending patent application.

Automatic stabilisers known per se from conventional aircraft may be used in addition to control by the driver, which may be so designed as to require substantially the same movements of the driver on the ground and in the air.

Figure 2:
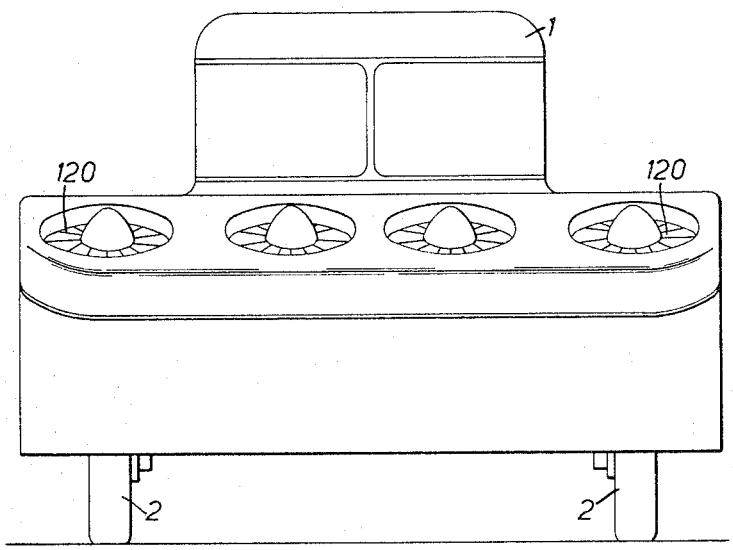
Figure 4:
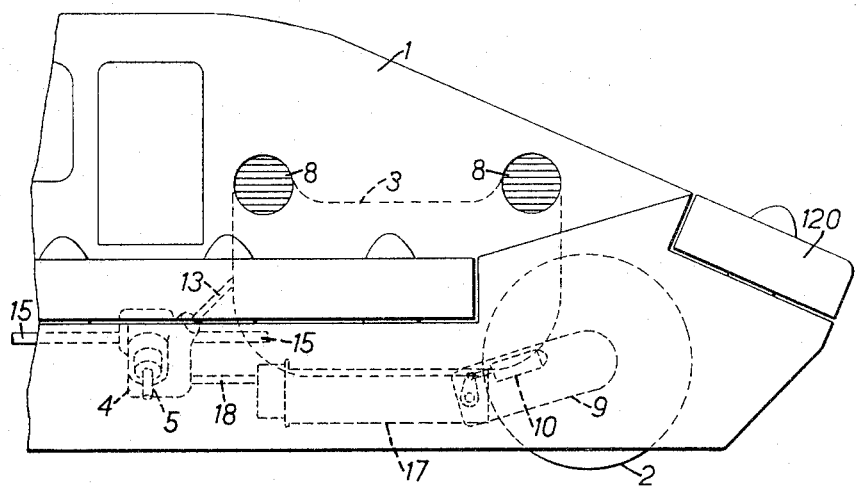
Figure 3:
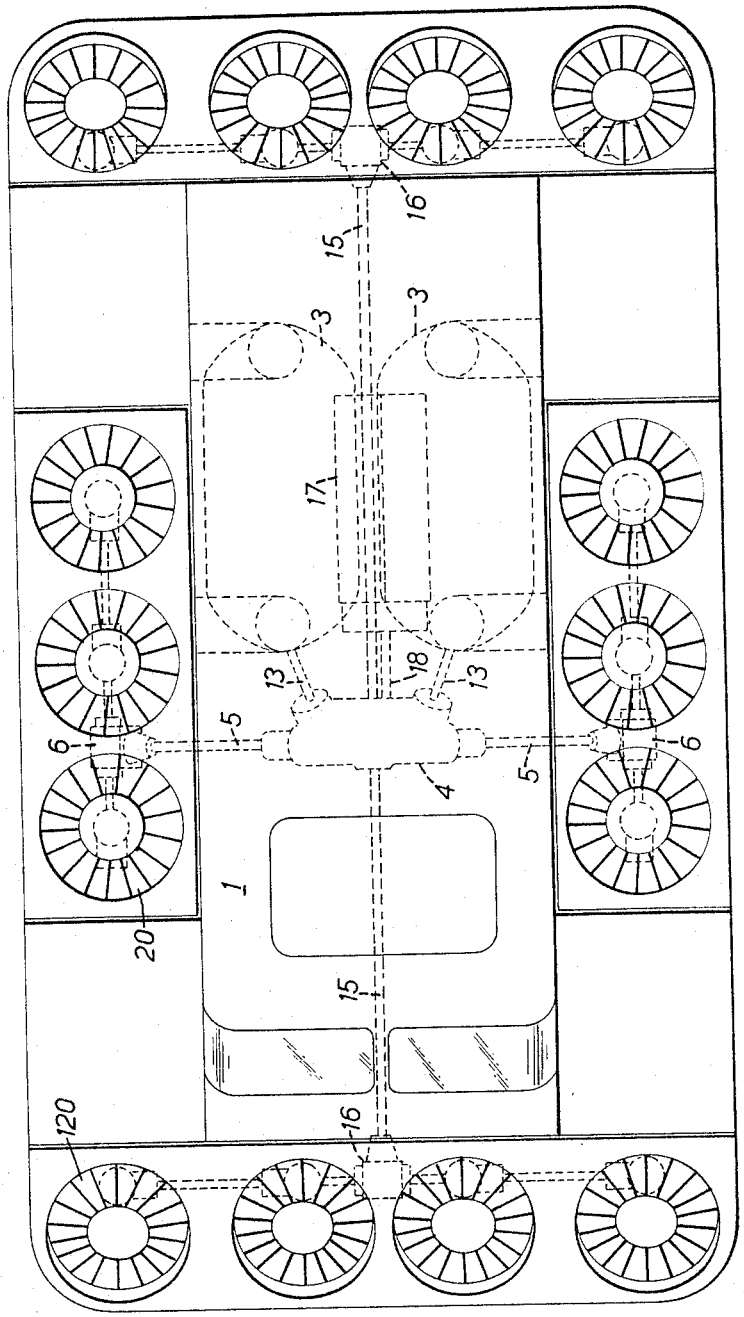
Figure 5:
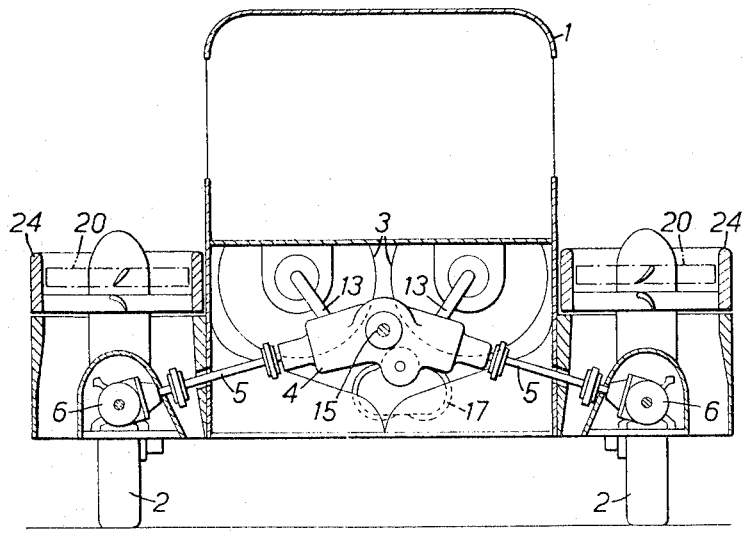
Figure 6:
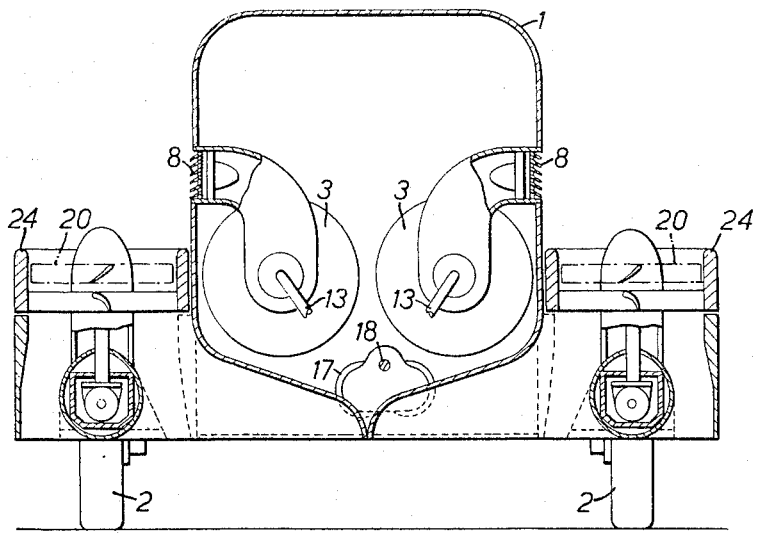
Figure 7:
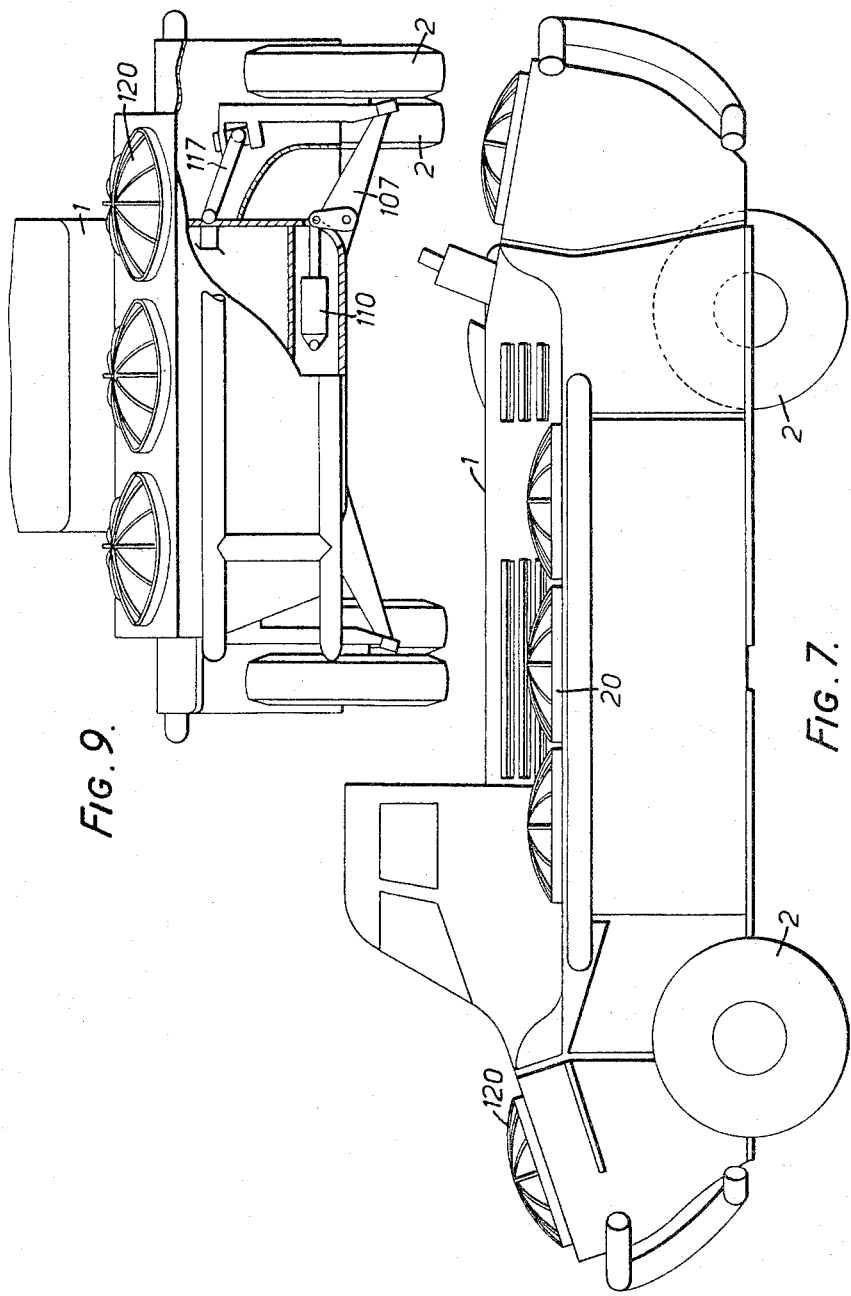
Figure 8:
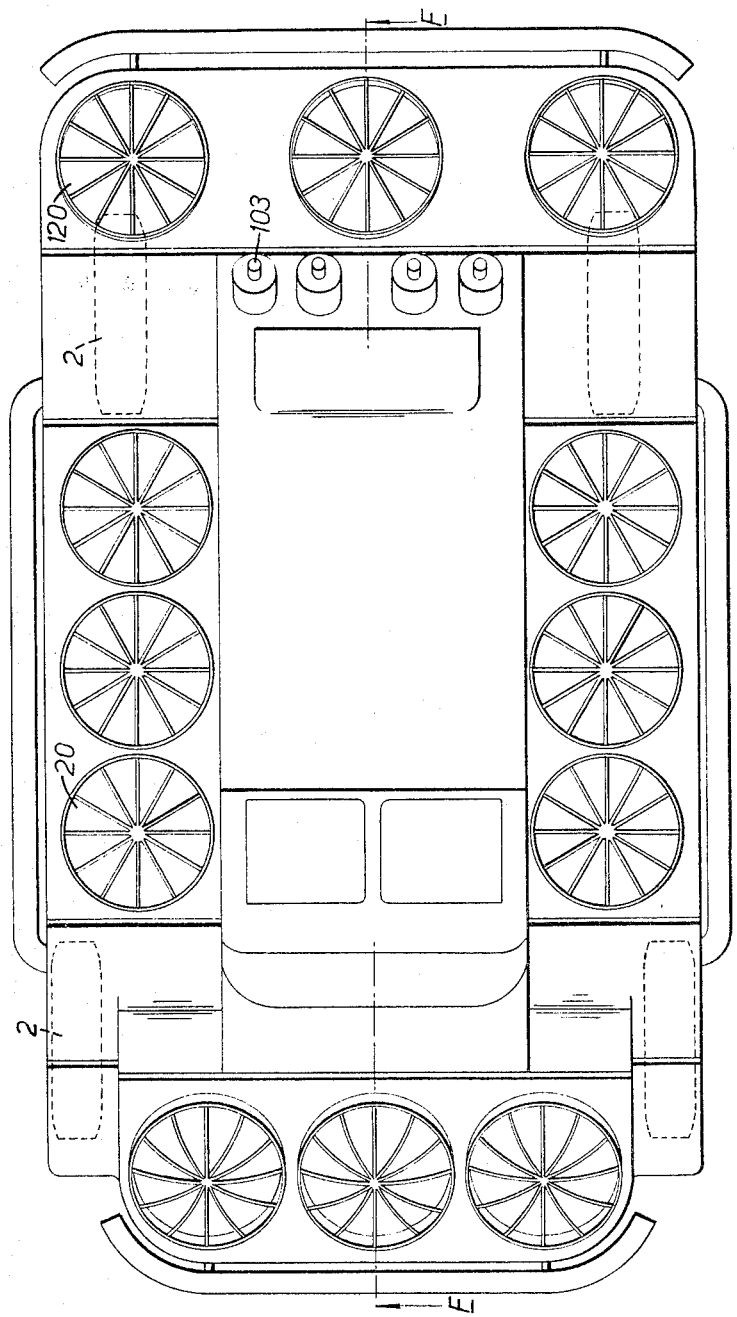
Figure 12:
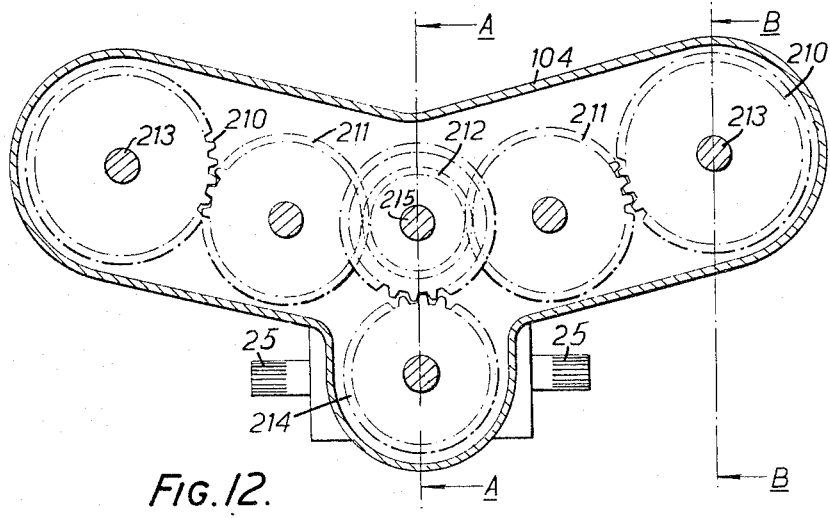
Figure 13:
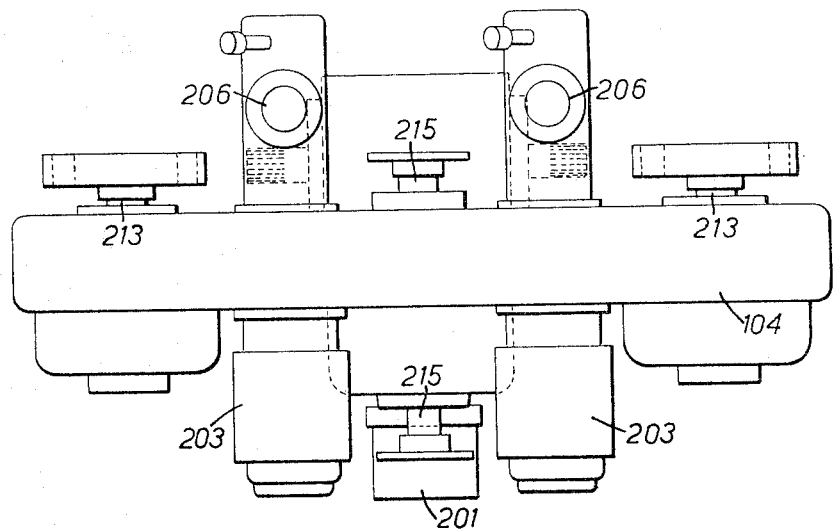
Figure 14:
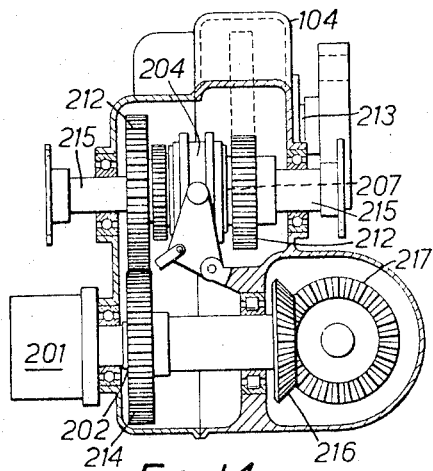
Figure 15:
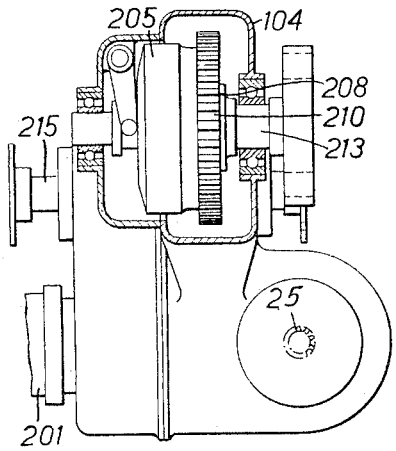
Figure 16:
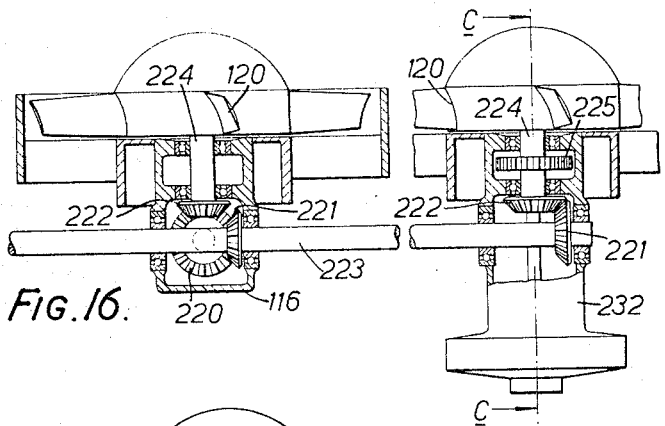
Figure 17:
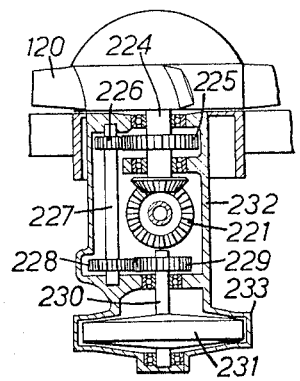

In order that the invention may be clearly understood and readily carried into effect, an embodiment thereof will now be described by way of example with reference to the accompanying drawings in which:

FIG. 1 is a diagrammatic side elevation,
FIG. 2 is a diagrammatic front elevation,
FIG. 3 is a diagrammatic plan view,
FIG. 4 is an elevation corresponding to the rear portion of FIG. 1,
FIG. 5 is a front elevation in section on the line V—V of FIG. 1,
FIG. 6 is a front elevation in section on the line VI—VI of FIG. 1,
FIG. 7 is a side elevation,
FIG. 8 is a plan view, and
FIG. 9 is an end elevation of a modified embodiment of the jet thrust supported vehicle according to the present invention.
FIG. 10 is a sectional elevation on the line F—F of FIG. 8,
FIG. 11 is a sectional elevation, the left hand half of which is a section on line D—D, and the right hand half on line E—E of FIG. 10.
FIG. 12 is an end elevation, and
FIG. 13 is a plan view of the main gear box of the embodiment according to FIGS. 7–11, on a larger scale.
FIG. 14 is a section on the line A—A of FIG. 12 and
FIG. 15 is a section on the line B—B of FIG. 12
FIG. 16 is a partly sectional end elevation of the drive mechanism of the ducted fans on the front of the vehicle, also on a larger scale, and
FIG. 17 is a section on the line C—C of FIG. 16.

Referring firstly to FIGS. 1 to 6 the vehicle body 1 containing a crew cockpit and a pay-load compartment is carried on the ground by four wheels 2, all of which are capable of being coupled, preferably by means of hydrostatic transmission, to one or the other of two internal combustion engines 3 for example by the aid of a main gear box 4 and two input shafts 13 thereof. These wheels 2 are articulated to the vehicle body 1 by means of leading links 7 and trailing links 9 respectively (FIG. 1) and are sprung by means of dual-purpose hydraulic jacks 10 serving also for retracting the wheels 2 up into the body 1 for hovering or leaping (FIG. 4). The steering of the vehicle on the ground is effected by applying a higher torque to the wheels 2 on the outside of the turn to be made than to those on the inside. This can be done for example, by control means known per se of the proposed hydrostatic drive, coupled to the steering wheel of the vehicle.

While this manner of steering may increase tire wear, the advantage of it is the considerable saving in weight of a conventional steering gear, and the saving of a large area of vehicle base and jet curtain by avoiding the use of steered front wheels.

The two internal combustion engines 3 are housed within the cooling air ducts, whose air intakes 8 are arranged on the sides of the vehicle body 1 and provided with screens to avoid the ingestion of foreign bodies. The engines are geared by the said main gear box 4, flexibly jointed shafts 5 and auxiliary gear boxes 6 to three fans 20 arranged on each of the longitudinal sides of the vehicle, and by means of shafts 15 and auxiliary gear boxes 16 to four fans 120 at the front and at the rear of the vehicle respectively.

The gear box 4 is also coupled to two contrarotating cylindrical flywheels 17 by means of a shaft 18, which serves as an input shaft for the energy of the engines to be stored in the fly-wheels 17, and as an output shaft for the energy of these fly-wheels to be transmitted to the fans 20, 120. These fans are provided with shroud rings 24, 124, respectively, including flow straightener blading downstream of the fans.

A set of flow straighteners is positioned immediately below each fan rotor to improve the efficiency and eliminate swirl in the air jet. As will be seen particularly in FIG. 5, each ducted fan 20 has a nozzle outboard of its axis of rotation, and a nozzle inboard thereof. The jets issuing from said outboard nozzles of all these ducted fans 20 form a combined outer jet curtain, and those issuing from said inboard nozzles form an inner jet curtain. It will be seen that the inboard nozzles are inclined towards the center of the vehicle body and thus impart an inward component on said inner jet curtain.

A flexible skirt may be added to the machine to contain the jet curtain until it reaches nearer the ground. This will improve performance. This skirt is suspended on cables so as to raise it for cross country running purposes, using the vehicle's wheels.

Referring to FIGS. 7 to 11, ordinary steering of the front wheels 2 has been adopted, which are linked to the vehicle body by means of conventional radius arms 107, 117 and sprung by hydraulic jacks 110 serving also as shock absorbers (FIG. 9). In view of the structural requirements of the conventional steering gear the number of ducted fans 120 at the front of the vehicle has been reduced to three, and for reasons of standardisation of the driving gearing the number of ducted fans 120 at the rear of the vehicle has likewise been reduced to three (FIGS. 8 and 9).

Two double-four cylinder radial air-cooled engines 3 having exhaust mufflers 103 are arranged side by side (FIGS. 10 and 11), each driving the main gear box 104 (to be described later in more detail with reference to FIGS. 12–15) through a shaft 113 with universal joints at both ends. From this main gear box 104 longitudinal drives 115 transmit motion to the forward and rear central gear boxes 116 (FIG. 10), and transverse drives 105 transmit motion to the central lateral gear boxes 106 (FIG. 11) to be described later in more detail (with reference to FIGS. 16 and 17). The engine compartment is ventilated through louvres 108 by the aid of cooling fans 109 (FIGS. 10 and 11).

It will be seen, that while differing from the embodiment according to FIGS. 1–6 in detail, the general arrangement of the two embodiments of the jet thrust supported vehicle are in principle the same.

FIG. 11 shows an arrangement of inboard and outboard nozzles of the ducted fans 20 similar to that described hereinabove with reference to FIG. 5, and producing likewise an inner and outer jet curtain.

Referring now to FIGS. 12–15, in the main gear box 104 two input shafts 213 are journalled, each of which is coupled to an engine output shaft 113 (FIG. 10). Each of these input shafts 213 drives through a freewheel 208 and a clutch 205 a gear train 210, 211, 212, the last gear 212 being in common to both gear trains. The latter drives through a freewheel 207 and a synchromesh engagement mechanism 204 two longitudinal output shafts 215 journalled in the main gear box 104 which are coupled to the front and rear drive shafts 115, respectively (FIG. 10).

The spur gear 212 common to both gear trains meshes also with a spur gear 214, which through a freewheel 202 is coupled to a hydraulic motor 201, and through bevel gearing 216, 217, drives two transverse output shafts 25, which are coupled to the transverse drive shafts 105 (FIG. 11). Main hydraulic pumps 203 and auxiliary hydraulic pumps 206 are geared to said gear trains, e.g. mounted on opposite ends of the shafts of the gear wheels 211 (FIG. 13).

The main hydraulic pumps 203 are each connected through a throttle valve (not shown) controlled by the driver of the vehicle to the said hydraulic motor 201, which is also connected to a hydraulic accumulator (not shown).

The auxiliary pumps 206 are connected through valves controlled by the driver of the vehicle to the hydrostatic drive (not shown) of the ground wheels 2 of the vehicle.

Referring now to FIGS. 16 and 17, each drive shaft 115 drives a bevel gear 220 journalled in a central gear box 116 and meshing both with a bevel gear 221 on a horizontal transmission shaft 223, and a bevel gear 222 on a vertical shaft 224 driving the central ducted fan 120.

The transmission shaft 223 is journalled in the central gear box 116 as well as in the outer gear boxes 232, one of which only is shown in FIG. 16, where it carries likewise a bevel gear 221 in mesh with a bevel gear 222 on the vertical shaft 224 of a ducted fan 120. However, the two outer gear boxes 232 include also a fly-wheel mechanism, which is driven from the vertical shaft 224 through a large spur gear 225 in mesh with a small spur gear 226 on a vertical lay shaft 227 journalled in the gear box 232 and carrying a spur gear 228. The later meshes with a spur gear 229 on the shaft 230 of a fly-wheel 231 journalled in an evacuable casing 233 fixedly connected or integral with the gear box 232.

The construction of the lateral gear boxes 106 and the fans and fly-wheels driven by them corresponds to the arrangement described hereinabove with reference to FIGS. 16, 17.

In operation for starting the engines 3 the hydraulic motor 201 is put in throttled connection with the hydraulic accumulator (not shown) while the clutches 205 are disengaged. The hydraulic motor 201 thus drives, through the freewheel 202 and the gearing described hereinabove with reference to FIGS. 12–15, the drive shafts 105 and 115, and hence the transmission shafts 223 to the forward and rear group of ducted fans 120, as well as the transmission shafts to the lateral groups of ducted fans 20 (FIGS. 10, 11). These ducted fans are feathered at these stages to reduce power consumption.

Through the gearing described with reference to FIGS. 16 and 17 the fly-wheels 231 are driven up to a speed at which sufficient mechanical energy is stored for starting the engines 3, by engaging the clutches 205, one after the other or simultaneously. Then the engines are accelerated to idling speed and drive the main gear box through the freewheels 208, while the clutches 205 are disengaged.

The main pumps 203 are then connected to the hydraulic motor 201, and the hydraulic accumulator (not shown) is disconnected. The hydraulic motor is thus kept running at a suitable idling speed, whereby damage to the bearings of the ducted fan drive system by "brinelling" under the vibrations caused by the vehicle running cross country on wheels 2 is prevented. The auxiliary pumps 206 supply hydraulic pressure for the hydrostatic drives of the said ground wheels 2.

Preparatory to a leap, the throttle valves (not shown) to the hydraulic motor 201 are fully opened, and said motor accelerates the flywheels 231. The ducted fans 20 and 120 are still in the fully feathered position.

The synchro-mesh device 204 is spring loaded in the sense of engagement, but cannot mesh with the transmission until synchronous speed is reached. The transmission is accelerated of the hydraulic motor 201 and when the speed of the engine or engines 3 is reduced this synchronous speed is attained, and the engagement of the synchro-mesh device 204 is completed.

The engines 3 are then set to maximum power and accelerate the ducted fans 20 and 120 and flywheels 231 to full speed, while the hydraulic motor 201 is throttled in order to avoid wastage or energy and the freewheel 202 overruns.

By setting the ducted fans to active pitch the increased energy required for the leap is released both from the engines 3 and the flywheels 231.

By arranging the flywheels 231 at the outer ends of the transmission shafts, the latter and the central gear boxes 106 and 116 are relieved, since the energy required for the ducted fans coupled with these flywheels is mainly derived from these flywheels, while the central ducted fans of all four groups derive their energy mainly directly from the engines 3. This allows considerable savings in the weight and costs of the whole transmission mechanism.

After the leap, the ducted fans are fully feathered and the hydraulic accumulator (not shown) is reloaded by the main pumps 203, while the auxiliary pumps 206 again supply the hydraulic energy for driving the ground wheels 2 of the vehicle.

While we have herein described and illustrated in the accompanying drawings what may be considered typical and particularly useful embodiments of our said invention we wish it to be understood that we do not limit ourselves to the particular details and dimensions described and illustrated; for obvious modifications will occur to a person skilled in the art.

What we claim as our invention and desire to secure by Letters Patent, is:

1. A gaseous jet thrust supported vehicle comprising in combination: a vehicle body having a front edge, a rear edge, and two lateral edges, road wheels journalled on said body and supporting said body on the ground, a prime mover mounted on said body, a plurality of ducted fans mounted along said front edge, said rear edge and said lateral edges of said body and means capable of gearing said ducted fans to said prime mover, outboard and inboard nozzles directing the efflux of said ducted fans and in operation producing an outer and an inner jet curtain, respectively, enclosing at least one ground effect cushion of substantially rectangular plan form and having a substantially vertical momentum thrust of a magnitude less than the weight of said vehicle but exceeding the magnitude required for statically hovering at a steady hovering height, propulsion means capable of being geared to said prime mover, in operation imparting a substantially horizontal thrust to said vehicle, a flyween mechanism, speed-up transmission means capable of gearing said mechanism at an increased ratio of revolutions to said prime mover and to said ducted fans, said flywheel mechanism in operation storing energy from said prime mover and releasing the same in addition to that of said prime mover to said ducted fans, said ducted fans having blades mounted angularly adjustable, and control means capable of rapidly increasing the angle of said blades for extracting the energy stored in said flywheel mechanism in order to leap over obstacles of predetermined length and height, but not to sustain free flight above said steady hovering height.

2. A vehicle as claimed in claim 1, wherein at least one of said nozzles is inclined toward the center of said vehicle body so that its jet curtain has an inward component towards its associated ground effect cushion.

3. A vehicle as claimed in claim 1, comprising gaseous jet curtain producing means supplied by said ducted fans, said means being arranged transversely of said lateral edges of said vehicle substantially in the middle thereof so as to divide the ground effect cushion underneath said vehicle into two part cushions fore and aft of the middle of said vehicle, respectively.

4. A vehicle as claimed in claim 1 comprising at least two internal combustion engines and coupling means capable of coupling said engines with said road wheels or with said ducted fans.

5. A vehicle as claimed in claim 1, comprising at least two internal combustion engines and coupling means capable of coupling said engines simultaneously with said road wheels and ducted fans.

6. A vehicle as claimed in claim 1, comprising at least two internal combustion engines and coupling means capable of coupling said engines singly to said road wheels and collectively to said ducted fans.

7. A vehicle as claimed in claim 1, wherein said wheels are kept in a constant directional relationship to said vehicle body and comprising means for applying a greater torque to the wheels on one side of the vehicle than to the wheels on the other side of said vehicle.

8. A vehicle as claimed in claim 1, comprising control means of the blade angle and of the rotational speed differentially to said ducted fans on both sides of the vehicle for roll control, and differentially to said ducted fans at the front and rear of the vehicle for pitch control.

9. A vehicle as claimed in claim 1, comprising variable ratio transmission gearing interposed between said flywheel mechanism and said ducted fans allowing the latter to rotate at substantially constant speed while the rotational speed of said fly-wheel mechanism diminishes as it gives off energy to said ducted fans.

10. A vehicle as claimed in claim 1, wherein the ducted fans at the front edge, those at the rear edge and those at each side of the vehicle each have a middle gear box and a transmission shaft gearing them to their respective middle gear box, said fly-wheel mechanism comprising separate fly-wheels geared directly to the outer ducted fans, and said middle gear boxes being directly geared to the inner ducted fans, said prime mover having a main gear box and longitudinal and transverse drive shafts connecting said main gear box with said middle gear boxes, respectively.

References Cited by the Examiner

UNITED STATES PATENTS

| | | | |
|---|---|---|---|
| D. 183,816 | 10/1958 | Simmons. | |
| 2,989,269 | 6/1961 | Le Bel | 244—12 |
| 3,026,066 | 3/1962 | Coates | 180—7 |
| 3,082,977 | 3/1963 | Arlin | 244—12 |
| 3,117,747 | 1/1964 | Creasey et al. | 244—12 |

FOREIGN PATENTS

| | | |
|---|---|---|
| 900,903 | 7/1962 | Great Britain. |
| 909,118 | 10/1962 | Great Britain. |

A. HARRY LEVY, *Primary Examiner.*

SAMUEL FEINBERG, *Examiner.*

R. F. STAHL, *Assistant Examiner.*